United States Patent Office 3,235,582
Patented Feb. 15, 1966

3,235,582
CYCLOHEXYLMETHYL PHENOXYACETATE
Henry E. Hennis, Midland, Mich., assignor to The Dow Chemical Company, Midland, Mich., a corporation of Delaware
No Drawing. Filed Sept. 7, 1962, Ser. No. 222,209
1 Claim. (Cl. 260—473)

The present invention is concerned with organic chemistry and is particularly directed to the cyclohexylmethyl ester of penoxyacetic acid, corresponding to the formula

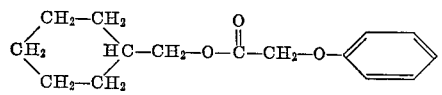

Under ordinary conditions the compound is a colorless liquid, slightly soluble in water, readily soluble in acetone, 95 percent ethanol, xylene, and similar organic solvents. The compound is useful for the control of insects.

The compound is prepared by esterifying cyclohexylmethanol with phenoxyacetic acid. Preparation of the present compound consumes the alcohol and acid starting materials in equimolecular proportions. The employment of such proportions in reaction mixture is efficient. Other amounts may be employed if desired. Water of reaction is stoichiometrically formed and its formation may be taken as an indication of progress of reaction. It can be removed readily in known procedures as by azeotropic distillation.

In carrying out the reaction to prepare the present compound, phenoxyacetic acid is intimately mixed and stirred together with cyclohexylmethanol, desirably in the presence of an acidic esterification catalyst. The reaction goes forward smoothly at temperatures over a wide range, and is preferably carried out with moderate heating, as, for example, at the temperature of boiling water. Advantageously, the reaction is carried out in an inert liquid reaction medium, such as toluene, xylene, or the like. Preferably such reaction medium should be capable of forming a water azeotrope whereby, in carrying out the reaction under reflux equipped with water separator and at the boiling temperature of the reaction medium, water of reaction is continuously removed as it is formed. Some product is formed immediately upon contacting of the reactants. Upon completion of the esterification reaction, a crude product is present in good yield and may be employed in that form if desired. When it is desired to obtain the product in the absence of such impurities as catalyst and reaction medium, pure product may be separated in known methods, for example, by neutralizing and washing away catalyst and by fractional distillation.

The following example, without more, will enable those skilled in the art to practice the present invention.

Example 1

Into a 2-liter 3-necked round-bottomed flask equipped with a motor stirrer, thermometer, and azeotropic distillation column was placed 304.2 grams (2 gram moles) of phenoxyacetic acid, 228 grams (2 gram moles) of cyclohexylmethanol, 10 grams of p-toluenesulfonic acid as catalyst, together with 500 milliliters of tulene. The resulting reaction mixture was heated with stirring, continuously over a period of between 4 and 6 hours, during which time water of reaction formed and was continuously removed from the reaction mixture by azeotropic distillation with reflux of solvent. At the conclusion of the reaction time, the resulting reaction mixture was allowed to cool and was then poured into 500 grams crushed ice. As a result of these procedures, ice melted and the resulting mixture separated into aqueous and organic phases. The phases were separated, and the organic phase layer washed twice with 500 milliliter portions of aqueous 5 percent sodium bicarbonate solution and thereafter twice with 500 milliliter portions of water. The resulting washed organic solution was thereafter fractionally distilled at gradually increasing temperatures and declining subatmospheric pressures whereby there was obtained a cyclohexylmethyl ester of phenoxyacetic acid, as a colorless liquid boiling at 120–121° C. under a pressure of 0.1 millimeters of mercury, absolute. The product liquid had a refractive index $n/D$ at 25° C. of 1.5139. Upon the basis of elemental analysis, its purity was calculated to be above 95 percent. The assigned structure is confirmed by infrared analysis.

A spray dispersion was prepared, containing as sole toxicant, the compound of the present invention at the rate of approximately 0.4 pound thereof per hundred gallons of resulting aqueous dispersion. This preparation was applied as a thorough wetting application to a population of young, healthy American cockroaches. The treated cockroaches were then set aside under favorable conditions for 2 hours and thereafter examined. It was ascertained that a substantial part of the population of cockroaches had been killed.

I claim:
Cyclohexylmethyl phenoxyacetate.

References Cited by the Examiner
UNITED STATES PATENTS 2,396,513  3/1946  Jones _____ 167—45
2,441,183  5/1948  Bludworth et al. _____260—468

LORRAINE A. WEINBERGER, Primary Examiner,
LEON ZITVER, Examiner.